July 17, 1962

H. L. FULTON 3,044,527

METHOD AND APPARATUS FOR MAKING CONNECTIONS TO LEAD WASTE PIPING

Filed Oct. 27, 1958

INVENTOR.
HARRY L. FULTON
BY
ATTORNEYS

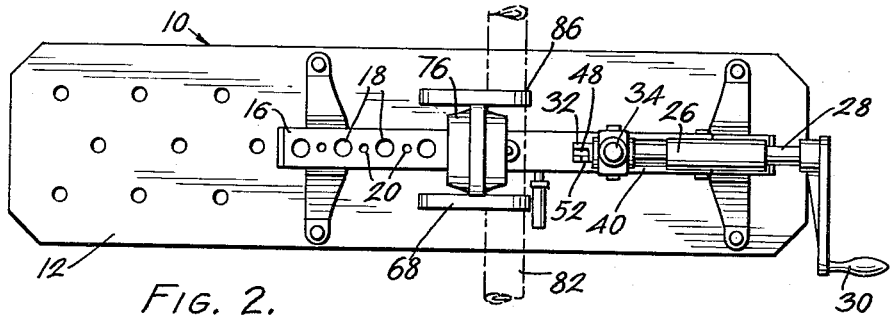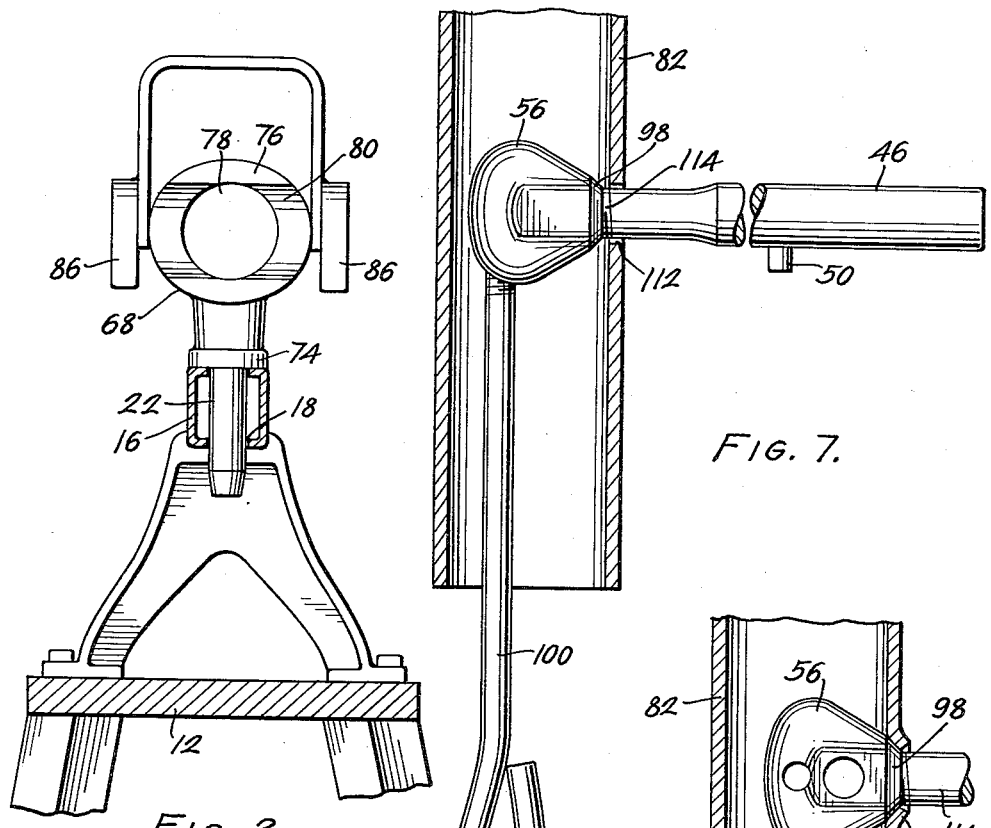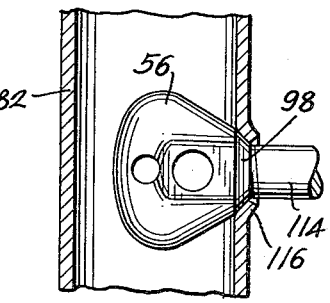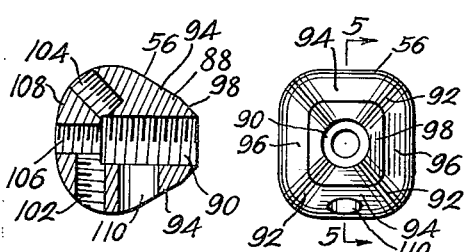

INVENTOR.
HARRY L. FULTON
BY
ATTORNEYS

United States Patent Office 3,044,527
Patented July 17, 1962

3,044,527
METHOD AND APPARATUS FOR MAKING CONNECTIONS TO LEAD WASTE PIPING
Harry L. Fulton, 805 E. 11th St., Pueblo, Colo.
Filed Oct. 27, 1958, Ser. No. 769,777
8 Claims. (Cl. 153—21)

This invention relates to improvements in tools and methods for use in the fabrication of soft wall drainage and supply piping and, more particularly, to tools and methods for use in the fabrication of connections in materials such as lead, soft copper and brass as used generally in the plumbing industry.

The common practice which has been used for many years to join waste piping such as lead to lead, lead to brass and copper, and also other combinations, is by means of a wiped solder joint made by inserting a prepared male end into a prepared female end opening and forming a thick joint from molten solder shaped with a wiping cloth. This method requires considerable skill, much valuable time and an excessive amount of solder. Also, more solder is used than is required to produce a sound joint and much of it is lost in the process. Copper and brass piping have replaced lead waste pipe to considerable extent in the plumbing industry. This became possible by standardization of copper and brass pipe and fittings which made it feasible to use simple sweated joints. The simplicity with which these joints are formed is assisted by improvements in portable heating torches, better solder and fluxes. Such joints are considered "streamlined" since the fittings are small and the seal is made internally by a sweat-soldering process in contrast to lead waste piping which is installed with externally wiped joints and other unsightly characteristics.

The instant invention provides a method and tools for preparing lead waste pipe, including various joints and fittings used therewith, to be joined together rapidly by aforementioned sweat-joint. The sweat joint is formed by the insertion of a male end into a mating female end which is slightly larger and the joint is completed by the capillary action of molten solder.

Using the method and tools of the instant invention, a plumber may prepare mating plumbing pipe and/or fittings to be connected by either a soldered sweat joint or a wiped solder joint, as required. The machine and method of the instant invention also make it possible to connect lead waste pipe with all necessary cooperating fittings of brass or copper in the sweat-joint manner at a great saving in cost while providing a more finished appearance.

Relatively recently, there have been a number of attempts to improve upon the methods and apparatus for preparing the mating plumbing pipe and/or fittings for the sweat-joint technique and thereby eliminate some of its problems; however, these efforts have met with little commercial success or acceptance by the plumbing trade. There are several reasons which explain the failure of these methods and tools to find favor with the plumbers, the principal ones being that many have proven as awkward and time-consuming as the preparation for the wiped joint technique while others, although simplified, fail to produce an acceptable joint. For example, several of these methods require that a cuff or upstand be formed on the side of the pipe or fittings by drawing a tool outwardly through a pilot hole which is fine in theory; however, in practice it has been found that the resulting cuff is too short and oftentimes includes a ragged edge or other irregularity that makes a liquid-tight joint extremely difficult to form thereon. Also, they cannot be used to form cuffs adapted to receive and mate with pipes or fittings of the same approximate diameter as the element upon which the cuff is formed. The latter, of course, is a common situation in a plumbing installation.

Specifically, the prior art methods for this purpose provide that a tool be pulled through a small pilot hole in the wall of a lead or soft metal pipe without being rotated. When this is done, the cuff thus formed has a tendency to spit, become scored and generally irregular insofar as wall-thickness, cuff length and edge conformation are concerned. Also, the particular tool or bobbin used with the prior art methods is deficient in several respects. One of these is that a tool which is merely drawn through the pilot hole must have a circular cross section and be in substantially continuous annular contact with the edge of the workpiece wall surrounding the pilot hole. Such a non-rotating tool would be extremely difficult to pull through the hole because of the extreme frictional resistance between it and the workpiece wall.

It is, therefore, the principal object of the present invention to provide an improved method and apparatus for forming connections between lead or soft metal pipe fittings and pipe as used in the plumbing industry.

A second object is the provision of a method for drawing a cuff on the wall of a lead or soft metal pipe wherein the cuff-forming tool is both pulled and rotated in being drawn through the pilot hole.

A third objective is the provision of a novel and improved machine for use in performing the several steps of the method.

Another object of the invention is to provide a cuff-forming tool or bobbin designed to be both pulled and rotated as it is drawn through the pilot hole in the wall of the workpiece.

Still another object is the provision of a plumber's tool that can be used to form a joint or branch connection between two lead pipes of the same approximate diameter.

An additional object is the provision of a method and apparatus for forming branched connections in lead or soft metal piping which enable a simple sweat-joint to be used in place of the complicated wiped joint with its resultant greater solder consumption, time and skill requirements.

Further objects of the invention are the provision of a method and apparatus of the type described which are simple, fast, operable by a single relatively unskilled workman, and adaptable for use with a wide variety of different types and styles of lead plumbing fittings including pipe, drum traps, elbows, T's, couplings, etc.

Other objects will be in part apparent and in part pointed out specifically hereinafter in connection with the description of the drawing that follows, and in which:

FIGURE 2 is a top plan view of the machine;

FIGURE 3 is an enlarged fragmentary section taken along line 3—3 of FIGURE 1 showing the work-holding saddle in place upon the bed;

FIGURE 4 is an end elevation of the cuff-forming tool or bobbin;

FIGURE 5 is a section taken along line 5—5 of FIGURE 4;

FIGURE 7 is a view similar to FIGURE 6 illustrating the location of the bobbin within the workpiece preparatory to being turned and pulled through the pilot hole by the mandrel attached thereto after the handle has been removed;

FIGURE 8 is a view similar to FIGURE 7 except that the handle has been detached from the bobbin which has begun to form the cuff;

Figure 1:
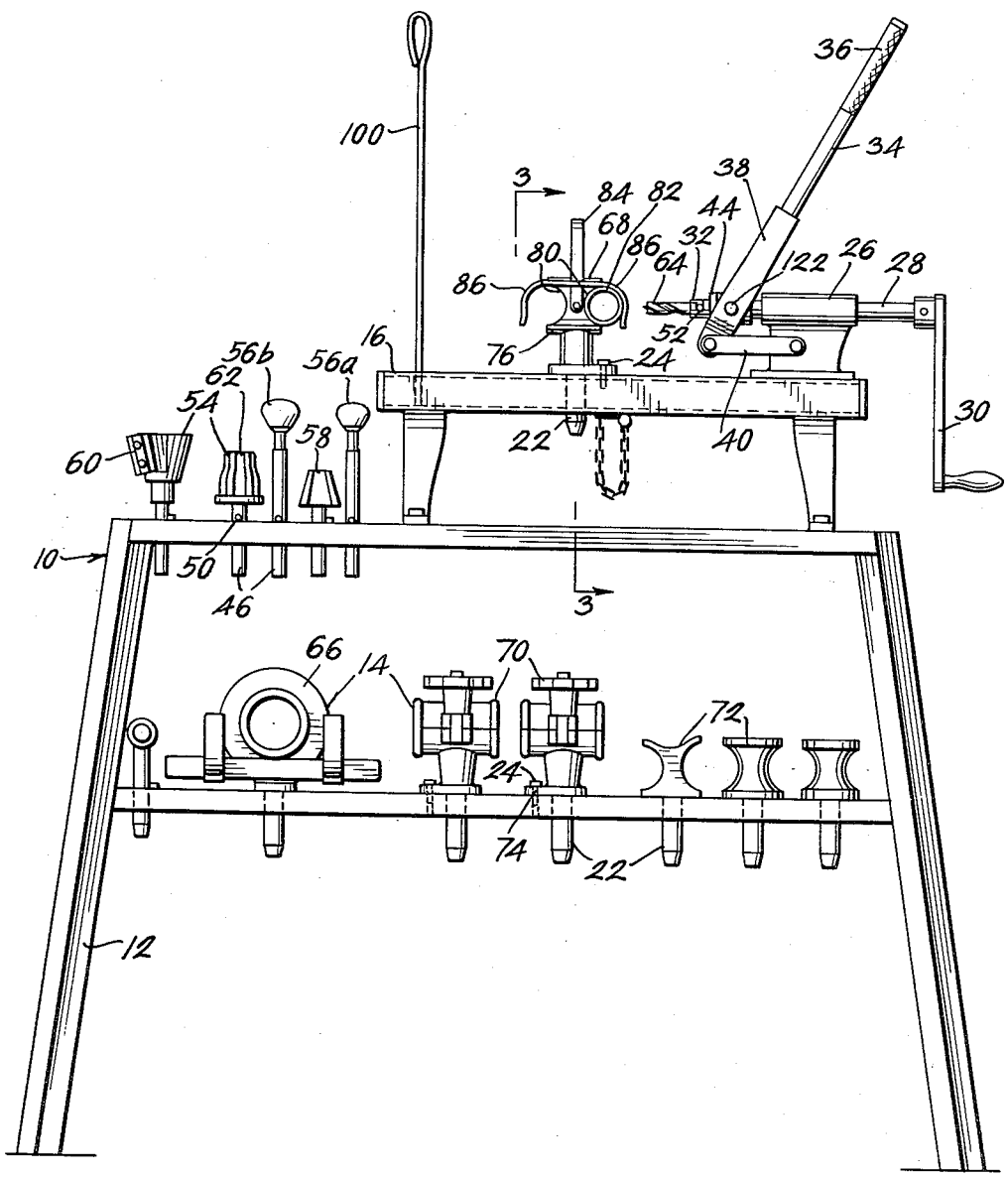
FIGURE 1 is a side elevational view showing one form of the plumbing machine of the present invention with a set of tools used therewith carried by the base.

Referring now to the drawing, and in particular to FIGURES 1 and 2 thereof, it will be seen that the apparatus for carrying out the method of the present invention includes a machine indicated generally by numeral 10 which is supported on a base 12 adapted to carry the several accessories that have been designated broadly by numeral 14. The machine 10 comprises an elongated flat bed 16 having a plurality of alternate large openings 18 and small openings 20 spaced along a portion of its length and adapted to receive the posts 22 of the saddles and the retaining pin 24 used to lock the saddles non-rotatably to the bed. A head 26 is mounted at one end of the bed and carries a shaft 28 therein for both rotational and reciprocal movement about a common axis substantially parallel to the bed and extending in the direction of the length thereof. A crank 30 is fastened to one end of the shaft in the specific embodiment illustrated herein for use in turning the chuck 32 carried by the other end. Reciprocating motion of the shaft relative to the head and along the bed is accomplished by means of an operating lever 34 which includes a handle portion 36 at one end and a bifurcated portion 38 at the other. The free end of the bifurcated portion is pivotally attached to one end of a pair of links 40 which have their other ends pivotally attached to the head on oposite sides thereof. A sleeve 42 within which the chuck is freely rotatable, and which is retained between a pair of longitudinally spaced collars 44 that depend from the chuck, is pivotally connected to the bifurcated portion of the operating lever at a point between the ends thereof. Thus, when the handle portion of the operating lever is swung acurately toward and away from the head, the link and sleeve pivotally connected thereto cooperate to reciprocate the shaft even while it is being turned by the crank. In this connection it is understood, of course, that other conventional hand-operated or power-driven means for reciprocating and rotating the chuck could be substituted for the mechanism shown although the latter has the definite advantages of compactness, simplicity and low cost.

The chuck 32 is generally tubular having an axial opening therein sized to receive the mandrel 46 of the tools and a longitudinal slot 48 adapted to pass the locking pin 50 on the mandrels into position to be rotated into notch 52 in the side thereof. The notch is located relative to the slot such that the locking pin tends to seat therein as the tool is turned within a workpiece.

Among the accessories 14 used with the machine 10 are a plurality of tools 54 each of which is mounted on one end of a mandrel 46 having a locking pin 50. In FIGURE 1, two different sizes of bobbins 56a and 56b have been shown which are used to form the cuff or upstand in the workpiece as will be described presently. Element 58 is a flaring tool for the cuff and element 60 is a tapering tool used to taper the ends of the mating piece. Numeral 62 designates a reamer-type tool used to enlarge the end of a lead pipe or fitting; whereas, tool 64, which is shown in the chuck, is a drill used to make a pilot hole in the wall of the workpiece. Various other accessories 10 have also been illustrated among which are a drum trap saddle 66, a pipe saddle 68, pipe clamps or vises 70, and several pipe-bending dies 72. Each of the last-named accessories is mounted on a post 22 adapted to fit into one of the large openings 18 in the bed 16 of the machine. A flange or skirt 74 surrounds each post and has an opening therethrough which is alignable with one of the small openings 20 in the bed to receive pin 24 that holds the accessory in proper alignment with the tool 54 carried by the chuck 32.

In FIGURES 1, 2 and 3, the pipe saddle 68 has been shown in position upon the bed of the machine and it will be seen to include a body 76 having a central opening 78 therethrough intersected at both ends by semicylindrical depressions 80 sized to receive a cylindrical workpiece 82 in perpendicular relation to the axis of shaft 28. Central opening 78, on the other hand, is sized to pass any of the tools 54 and is preferably located coaxially with respect to shaft 32. A double-ended clip member 84 is pivotally attached to the sides of the body 76 for rockable movement into a closed position wherein the downturned hooks 86 formed on opposite ends thereof become operative to engage and hold the workpiece 82 within either of the depressions 80. Pipe saddles 68 are made in various sizes to accommodate workpieces of different diameters and their location on the bed relative to the tool may be selected for convenience in performing the various operations thereon.

FIGURES 4 and 5 illustrate one of the tools 54, namely the bobbin 56, which is one of the most important and novel elements of the plumbing apparatus of the present invention and which makes the improved method that will be described presently a workable one. The overall configuration of the bobbin 56 is, perhaps, best described as being generally pear-shaped in longitudinal cross section, as seen clearly in FIGURE 5, and generally rectangular in transverse cross section except that the corners are rounded. The front portion 88 of the bobbin contains a threaded socket 90 extending inwardly along the longitudinal axis into which the threaded end of mandrel 46 is connected. This front portion 88 is generally pyramidal in shape with the apex truncated by socket 90 and the converging edges 92 that lie between the opposed pairs of oppositely inclined flattened faces 94 and 96 being rounded as shown. The front end 98 of the front portion 88 which surrounds socket 90 is chamfered to provide a surface more steeply inclined relative to the longitudinal axis than the flattened faces 94 and 96. In practice it has been found that if the front end 98 is chamfered at an angle of approximately 45° to the longitudinal axis and flattened faces 94 and 96 are inclined at an angle of between approximately 30° to 35° to said axis, the bobbin performs its intended cuff-forming function quite satisfactorily.

As seen most clearly in FIGURE 4, the width of the bobbin is preferably greater than the thickness thereof in a plane normal to the longitudinal axis which, of course, means that inclined faces 94 are somewhat narrower than faces 96. While this is not absolutely necessary, it oftentimes is advantageous in facilitating insertion of the bobbin into the workpiece as shown in FIGURE 7, the handle 100 being attached within a threaded socket 102 which extends normal to the longitudinal axis and is located on a side having one of the narrow faces 94. The opposite side of the bobbin contains a similar threaded socket 104 inclined at 45° to the longitudinal axis which receives the handle and is used to position the bobbin in the bend of an elbow so that a cuff extending outwardly therefrom at an angle of 135° can be formed. A third threaded socket 106 is located in the rear portion 108 of the bobbin in coaxial relation to socket 90 for receiving the handle and positioning the bobbin to form a cuff in a closed end of a lead pipe or the like.

The maximum transverse dimension of the bobbin is the longest of the diagonals extending between the opposite rounded edges 92 lying in a plane normal to the longitudinal axis. This maximum transverse diagonal is important for several reasons. First of all, it determines the inside diameter of any cuff formed on a workpiece by the bobbin and may be the same length as the inside diameter of the workpiece. Secondly, the overall size of the bobbin is such that it will fit entirely within a circumscribed sphere having the maximum transverse diagonal of the bobbin as a diameter. In other words, no linear dimension of the bobbin exceeds the maximum transverse diagonal in length.

A few remaining features of the bobbin should be mentioned briefly although they are not of critical significance. The rear portion 108 of the bobbin is preferably rounded as shown and must fit entirely within a circumscribed sphere having the maximum transverse diagonal of the bobbin as its diameter regardless of shape. If desired, a pin socket 110 can be provided in one of the sidewalls of the bobbin adapted to receive a pin or some similar tool to be used in removing the bobbin from its mandrel.

Now, the method by which the above-described apparatus is used to form a branched connection between two bad plumbing fittings will be set forth in detail in connection with the remaining figures of the drawing, namely FIGURES 6–14, inclusive. In the interests of simplicity, the method of forming a branched T-connection between two lead pipes of the same diameter will be used as an illustrative example, although it is to be clearly understood that pipes and other fittings such as drum traps, elbows, etc. of the same or different sizes may be connected to one another by the same method. First of all, however, it will be well to point out that the workpiece 82 is clamped in place in the front semicylindrical depression 80 of the pipe saddle 68 by means of the front set of hooks 86 on clip member 84 as shown in FIGURE 1. Drill 64 is located in the chuck 32 in position to drill a pilot hole in the wall of the worpiece and the crank 30 is turned while operating lever 34 is rocked away from head 26 to accomplish the actual drilling operation.

Figure 6:
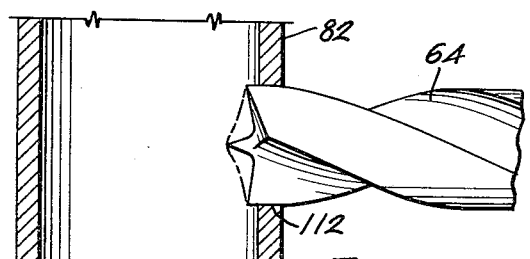
FIGURE 6 is a fragmentary section to an enlarged scale showing the manner in which the pilot hole is drilled in the wall of the workpiece.

With reference to FIGURE 6, it will be seen that the drill 64 is used to make a pilot hole 112 in the wall of the workpiece which comprises the first step of the method. Then, the front hooks 86 of the clip member 84 are preferably raised to release the workpiece from the front semicylindrical depression so that it can be relocated in the rear depression where it is retained by the rear hooks. Obviously, the shift of the workpiece between the front and rear semicylindrical depressions in the pipe saddle is done so that the body 76 will be located to resist both the thrust of the drill and the pull of the bobbin rather than relaying on the hooks to perform this function.

In FIGURE 7 it will be seen that the bobbin 56 has been pushed through an open end of the workpiece into position opposite the pilot hole by means of handle 100 which is connected into socket 102 therein. Then, with the handle still attached in place, mandrel 46 is passed through the pilot hole in the workpiece and connected within socket 90 in the apex of the bobbin; whereupon, the handle can be detached from the bobbin. Finally, the other end of the mandrel is connected into the chuck 32 in the manner already mentioned if this operation has not already been completed before the bobbin was attached thereto. At this point it would be well to point out that the threaded tip 114 of mandrel 46 is reduced in size to pass through the pilot hole 112 which is preferably quite small in order to leave as much material as possible in the workpiece wall with which to form the cuff.

FIGURE 8 shows the position of the bobbin within the workpiece as the chamfered front end 98 thereof engages the inside wall surface and begins to form the cuff 116 around the pilot hole as it is turned by the crank while being drawn toward the head by the operating lever. It is important to note in this connection that the steeply inclined chamfered end functions to stretch and produce a feathered edge on the wall material surrounding the pilot hole as it is pulled and turned therein. Thus, the ultimate length of the cuff is increased somewhat by stretching the wall during this stage of the forming operation which is significant in providing a sufficient lap of the mating surfaces in the final joint.

Figure 9:
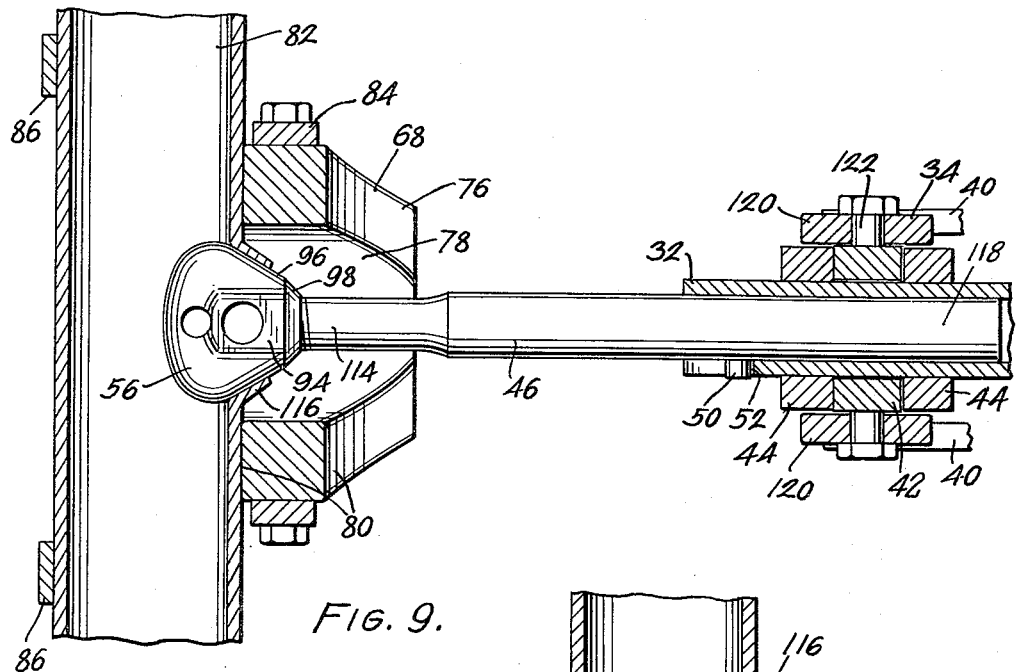
FIGURE 9 is a view much the same as FIGURE 8 in which the bobbin has further enlarged the pilot hole, and in which the work-holding saddle and check have been shown in section.

In FIGURE 9, the flattened surfaces 94 and 96 along with the rounded edges 92 of the front pyramidal portion 88 of the bobbin have entered into and enlarged the pilot hole. These surfaces, like chamfered end 98, also tend to stretch the material which forms the cuff. Also, only the rounded edges 92 actually engage the edges of the opening thus reducing the frictional contact between the bobbin and the workpiece. As the bobbin rotates while being drawn through the opening in the workpiece, it shapes the wall material into a smooth tapered cuff without any splits, burrs or other irregularities in its surface.

FIGURE 9 also shows the position of the body 76 of the pipe saddle 68 in relation to the workpiece during the cuff-forming operation. The central opening 78 in the body passes both the mandrel 46 and the bobbin 56 as the cuff 116 is formed therein. Also, the body reinforces the walls of the workpiece as the bobbin is pulled therethrough.

The shank 118 of the mandrel is retained within the chuck 32 by the locking pin 50 which locks within the notch 52 in the side of slot 48 as already mentioned. Longitudinally spaced collars or flanges 44 depend from the chuck and sleeve 42 is mounted for free relative rotational movement therebetween. The legs 120 of the bifurcated portion 38 of the operating lever are pivotally attached to the sleeve on opposite sides thereof by pins 122. Thus, the chuck is free to turn within the sleeve while it acts against one or the other of the collars to retract or extend the tool 54.

Figure 10:
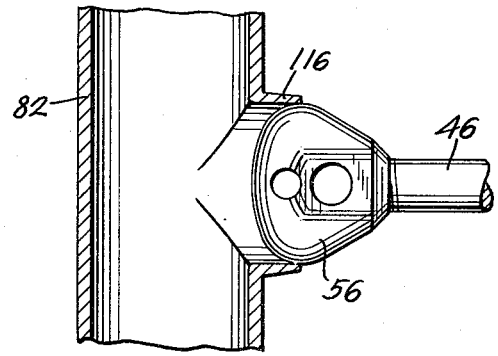
FIGURE 10 is a view like FIGURE 9 showing the bobbin as it emerges from the cuff.

FIGURE 10 shows the position of the bobbin immediately prior to its withdrawal from the cuff. Note that the inside diameter of the cuff is the same as the inside diameter of the workpiece and both of these dimensions are the same as the maximum transverse diagonal of the bobbin. Of course, the diameter of the cuff could easily be made less than that of the workpiece; however, few, if any, of the prior art methods and apparatus for this purpose can be used to form a cuff as large as the workpiece on which it is formed.

Figure 11:
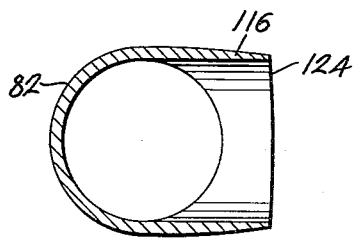
FIGURE 11 is a transverse diametrical section through the cuff.

FIGURE 11 shows even more clearly that the inside diameter of the cuff and workpiece are the same. It should also be noted that the wall of the cuff is tapered slightly and stretched or elongated sufficiently to provide for an ample overlap between the mating surfaces to be joined together which is one of the most serious limitations of the prior art methods.

Figure 12:
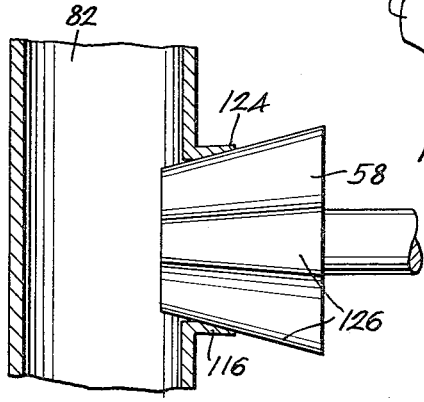
FIGURE 12 is a view similar to FIGURE 10 showing the flaring tool inserted into the cuff to flare the same.

In FIGURE 12, the last step in completing the cuff has been illustrated. For this operation, the bobbin 56 is removed from the chuck and replaced by a flaring tool 58. This step comprises flaring the cuff slightly along the feathered edge 124 thereof by means of the tapered flaring tool which is inserted into the cuff from the outside of the workpiece and rotated therein.

Figure 13:
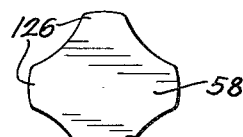
FIGURE 13 is an end elevation of the flaring tool.

Both FIGURES 12 and 13 show the shape of the flaring tool 58 as being generally frusto-conical with a plurality of outstanding ribs or flutes 126 arranged on the surface thereof. The taper of the flaring tool 58 is substantially the same as the flare of the tapering tool 60 used to form the mating end 128 of the branch pipe or fitting 130.

Figure 14:
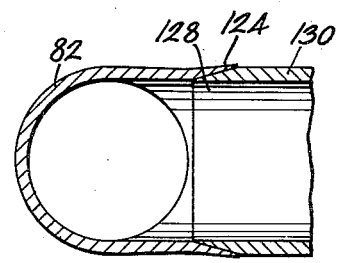
FIGURE 14 is a view similar to FIGURE 11 showing the tapered mating ends of the branch fitting in position within the flared cuff preparatory to sweating the joint thus formed.

In the last step of the method shown in FIGURE 14, the tapered edge formed on the mating end 128 of the branch fitting 130 is passed into the flared feathered edge 124 of the cuff until these opposed surfaces lap and engage one another. Then, molten solder is introduced between the mating surfaces in a manner to form a sweated joint by capillary action. No wiped solder joint is required with its attendant excessive solder requirements and the finished joint is little, if any, larger than the outside diameter of the fittings themselves.

Having thus described the several useful and novel features of the method and apparatus for forming branched connections between plumbing fixtures which comprises the subject matter of the present invention, it will be seen that the many worthwhile objectives for which it was designed have been achieved. Although but a single specific method and apparatus for use in accordance with the present invention have been illustrated and described, I realize that certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. A tool for use in forming a tubular cuff on the wall of a hollow lead plumbing fitting or the like which comprises, a generally pear-shaped metal member having a pyramidal-shaped portion with two pairs of oppositely inclined flattened faces separated by converging rounded edges.

2. The tool as set forth in claim 1 in which the pyramidal portion is truncated at the apex thereof by an axial socket adapted to receive a mandrel.

3. The tool as set forth in claim 1 in which the two pairs of opposite inclined flattened faces are arranged in equiangular spaced relation to one another.

4. The tool as set forth in claim 2 in which the truncated portion is chamfered around the axial socket.

5. The tool as set forth in claim 2 in which the flattened faces of the pyramidal portion are inclined relative to the longitudinal axis thereof at an angle between approximately 30° and 35°.

6. The tool as set forth in claim 3 in which one pair of flattened faces is inclined relative to the longitudinal axis of the pyramidal portion at an angle less than the angle of inclination of the other pair.

7. The tool as set forth in claim 3 in which the overall size and shape thereof is such that it would fit entirely within a sphere having as its radius the longest transverse diagonal extending between opposite rounded edges of the pyramidal portion in a plane normal to the longitudinal axis thereof.

8. The tool as set forth in claim 4 in which the truncated portion is chamfered at an angle of approximately 45° to the longitudinal axis of the pyramidal portion.

References Cited in the file of this patent

UNITED STATES PATENTS

| | | |
|---|---|---|
| 26,986 | Harwood | Jan. 31, 1860 |
| 628,404 | Forrester | July 4, 1899 |
| 779,511 | Weathers | Jan. 10, 1905 |
| 1,468,662 | Gifford | Sept. 24, 1923 |
| 1,534,520 | Gulick | Apr. 21, 1925 |
| 1,656,736 | Kellogg | Jan. 17, 1928 |
| 1,927,006 | Guibert et al. | Sept. 12, 1933 |
| 2,065,915 | Weston | Dec. 29, 1936 |
| 2,105,241 | Gazey | Jan. 11, 1938 |
| 2,213,574 | Weston | Sept. 3, 1940 |
| 2,297,013 | Nichols et al. | Sept. 29, 1942 |
| 2,649,127 | Lake | Aug. 18, 1953 |